US011761869B2

(12) United States Patent
Fini et al.

(10) Patent No.: US 11,761,869 B2
(45) Date of Patent: Sep. 19, 2023

(54) EVALUATING CHANGES IN BONDING INTERACTIONS BETWEEN INCLUSIONS AND A THERMOPLASTIC MATRIX

(71) Applicants: Elham Fini, Phoenix, AZ (US); Daniel Oldham, Tempe, AZ (US)

(72) Inventors: Elham Fini, Phoenix, AZ (US); Daniel Oldham, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 434 days.

(21) Appl. No.: 17/169,080

(22) Filed: Feb. 5, 2021

(65) Prior Publication Data

US 2021/0247285 A1 Aug. 12, 2021

Related U.S. Application Data

(60) Provisional application No. 63/146,245, filed on Feb. 5, 2021, provisional application No. 62/971,402, filed on Feb. 7, 2020.

(51) Int. Cl.
G01N 11/00 (2006.01)
(52) U.S. Cl.
CPC .................. *G01N 11/00* (2013.01)
(58) Field of Classification Search
CPC .............. G01N 11/00; G01N 13/00
See application file for complete search history.

(56) References Cited

U.S. PATENT DOCUMENTS

| 5,041,310 A | 8/1991 | Williams et al. |
| 2007/0149625 A1 | 6/2007 | Lark et al. |
| 2011/0219679 A1 | 9/2011 | Budarin et al. |
| 2012/0059084 A1 | 3/2012 | Brown et al. |
| 2017/0166722 A1 | 6/2017 | Zhamu et al. |
| 2021/0002173 A1 | 1/2021 | Lee et al. |

(Continued)

FOREIGN PATENT DOCUMENTS

| CN | 106752056 | 5/2017 |
| CN | 108949282 | 12/2018 |
| WO | WO 2021/097068 | 5/2021 |

OTHER PUBLICATIONS de Carteret et al. "Effect of Naturally Occurring Salts on Tensile and Shear Strength of Sealed Granular Road Pavements," J. Mater. Civ. Eng., 2014, 26(6):04014010 (Year: 2014).*

(Continued)

*Primary Examiner* — Nathaniel J Kolb
(74) *Attorney, Agent, or Firm* — Fish & Richardson P.C.

(57) ABSTRACT

Assessing an interaction between solid particles and a thermoplastic material in which the solid particles are dispersed includes combining a thermoplastic material with a multiplicity of solid particles to yield a heterogeneous mixture, processing the heterogeneous mixture to yield an unconditioned sample, conditioning the unconditioned sample to yield a conditioned sample, subjecting the conditioned sample to a ramping shear rate from an initial shear rate to a final shear rate, assessing a viscosity of the conditioned sample at a plurality of shear rates between the initial shear rate and the final shear rate, and assessing a value of a slope of a shear-thinning region for the unconditioned sample using a power-law equation.

20 Claims, 1 Drawing Sheet

(56) References Cited

U.S. PATENT DOCUMENTS

| | | |
|---|---|---|
| 2022/0089487 A1 | 3/2022 | Burton et al. |
| 2022/0267211 A1 | 8/2022 | Fini et al. |
| 2022/0355512 A1 | 11/2022 | Fini et al. |

OTHER PUBLICATIONS

[No Author Listed], "Method B11: The Determination of Adhesion of Bituminous Binder to Stone Aggregates by Means of the Chemical Immersion Test (Riedel and Weber)," Road Research Library, 1986, 3 pages.

[No Author Listed], "Method of Test for Film Stripping," Department of Transportation Division of Engineering Services Transportation Laboratory, California Test 302, Apr. 2014, 7 pages.

[No Author Listed], "Test Method for Determination of Methylene Blue Value (MBV) of Mineral Aggregate Fines," International Slurry Surfacing Association Bulletin No. 145, issued 1989, revised 2013, 2 pages.

AASHTO T283, Resistance of Compacted Asphalt Mixtures to Moisture-Induced Damage, American Association of State Highway and Transportation Officials, Washington, DC., 2014, 6 pages.

AASHTO T324-16, Standard Method of Test for Hamburg wheel-track testing of compacted hot mix asphalt (HMA), American Association of State Highway and Transportation Officials, Washington, DC., 2016, 11 pages.

Abu El-Maaty et al., "Characterization of Recycled Asphalt Pavement (RAP) for Use in Flexible Pavement," American Journal of Engineering and Applied Sciences, 2015, 8(2):233-248.

Aguiar-Moya et al., "Effect of aging on adhesion properties of asphalt mixtures with the use of bitumen bond strength and surface energy measurement tests," Transportation Research Record, 2015, 2505:57-65.

Aguiar-Moya et al., "Evaluation of adhesion properties of Costa Rican asphalt mixtures using the bitumen bond strength (BBS) and contact angle measurement tests," Paper #13-0743, Transportation Research Board 2013, 2013, 15 pages.

Ahmed et al., "Waste cooking oil as an asphalt rejuvenator: A state-of-the-art review," Construction and Building Materials, 2020, 230:116985, 11 pages.

Airey et al., "State of the Art Report on Moisture Sensitivity Test Methods for Bituminous Pavement Materials," Road and Materials and Pavement Design, 2002, 3(4):355-372.

Amini et al., "Simultaneous effects of salted water and water flow on asphalt concrete pavement deterioration under freeze-thaw cycles," International Journal of Pavement Engineering, 2014, 15(5):383-391.

Anderson et al., "Asphalt Binders," Transportation in the New Millennium, Transportation Research Board Committee A3B05, 2000, 6 pages.

asphaltpavement.org [online], "Engineering Overview," available on or before Dec. 25, 2019, via Internet Archive: Wayback Machine URL <https://web.archive.org/web/20191225012003/http://asphaltpavement.org:80/index.php?option=com content&view=article&id=14&Itemid=33>, 3 pages.

asphaltuk.org [online], "Annual independent survey," available on or before Nov. 1, 2020 via Internet Archive: Wayback Machine URL <http://web.archive.org/web/20201101004759/https://www.asphaltuk.org/alarm-survey-page/>, retrieved on Dec. 29, 2022, URL <https://www.asphaltuk.org/alarm-survey-page>, 2 pages.

ASTM D2872-12el, Standard Test Method for Effect of Heat and Air on a Moving Film of Asphalt (Rolling Thin-Film Oven Test), ASTM International, West Conshohocken, PA, 2012, 6 pages.

ASTM D3625/D3625M-12, Standard Practice for Effect of Water on Bituminous-Coated Aggregate Using Boiling Water, ASTM International, West Conshohocken, PA, 2012, 2 pages.

ASTM D3625/D3625M-20, Standard Practice for Effect of Water on Asphalt-Coated Aggregate Using Boiling Water, ASTM International, West Conshohocken, PA, 2020, 2 pages.

ASTM D6521-13, Standard Practice for Accelerated Aging of Asphalt Binder Using a Pressurized Aging Vessel (PAV), ASTM International, West Conshohocken, PA, 2013, 6 pages.

ASTM D7175-15, Standard Test Method for Determining the Rheological Properties of Asphalt Binder Using a Dynamic Shear Rheometer, ASTM International, West Conshohocken, PA, 2015, 16 pages.

ASTM D974-14e2, Standard Test Method for Acid and Base Number by Color-Indicator Titration, ASTM International, West Conshohocken, PA, 2014, 7 pages.

Ayers et al., "Perturbative perspectives on the chemical reaction prediction problem," International Journal of Quantum Chemistry, 2005, 101(5): 520-534.

Azahar et al., "Chemical modification of waste cooking oil to improve the physical and rheological properties of asphalt binder," Construction and Building Materials, 2016, 126:218-226.

Bai et al., "Effects of the N, O, and S heteroatoms on the adsorption and desorption of asphaltenes on silica surface: A molecular dynamics simulation," Fuel, 2019, 240:252-261.

Becke, "Density-functional thermochemistry. III. The role of exact exchange," J. Chem. Phys., Apr. 1, 1993, 98(7):5648-5652.

Berg, "How far do roads contribute to development?" World Economic Forum, Dec. 14, 2015, retrieved from URL <https://www.weforum.org/agenda/2015/12/how-far-do-roads-contribute-to-development/>, 4 pages.

Berger et al., "Summary Report: Breakout Session 2—Testing and Treatments," Moisture Sensitivity of Asphalt Pavements: A National Seminar, Transportation Research Board, San Diego, CA, Feb. 4-6, 2003, 9 pages.

Biller et al., "Potential yields and properties of oil from the hydrothermal liquefaction of microalgae with different biochemical content," Bioresource Technology, 2011, 102(1):215-225.

Bowers et al., "Refining laboratory procedure for artificial RAP: A comparative study," Constr. Build. Mater., 2014, 52:385-390.

Campen et al., "Effect of Aging on the Removal of Asphaltene Deposits with Aromatic Solvent," Langmuir, 2019, 35:11995-12008.

Canestrari et al., "Adhesive and cohesive properties of asphalt-aggregate systems subjected to moisture damage," Road Materials and Pavement Design, 2010, 11:11-32.

Cao et al., "Investigation of rheological and chemical properties asphalt binder rejuvenated with waste vegetable oil," Construction and Building Materials, 2018, 180:455-463.

Cárdenas et al., "Should negative electron affinities be used for evaluating the chemical hardness?" Phys. Chem. Chem. Phys., 2011, 13(6):2285-2293.

Chailleux et al., "Alternative Binder from microalgae: Algoroute project," Workshop Alternative Binders for Sustainable Asphalt Pavements, 2012, 9 pages.

Chaturabong et al., "Effect of moisture on the cohesion of asphalt mastics and bonding with surface of aggregates," Road Materials and Pavement Design, 2018, 19(3):741-753.

chemistry.wustl.edu [online], "Acid Rain—Inorganic Reactions Experiment," available on or before Jul. 14, 2019, via Internet Archive: Wayback Machine URL <http://web.archive.org/web/20190714104720/http://www.chemistry.wustl.edu/~edudev/LabTutorials/Water/FreshWater/acidrain.html>, retrieved on Feb. 14, 2020, URL <http://www.chemistry.wustl.edu/~edudev/LabTutorials/Water/FreshWater/acidrain.html>, 7 pages.

Chen et al., "Physical, chemical and rheological properties of waste edible vegetable oil rejuvenated asphalt binders," Construction and Building Materials, 2014, 66:286-298.

Choi et al., "Partially Oxidized Asphaltene as a Bitumen Viscosity Reducer," Energy and Fuels, 2017, 31(9):9240-9246.

Christensen et al., "Cost Benefit Analysis of Anti-Strip Additives in Hot Mix Asphalt with Various Aggregates," Pennsylvania DOT Final Report No. FHWA-PA-2015-004-110204, May 15, 2015, 106 pages.

Christensen et al., "Rapid analysis of microalgal triacylglycerols with direct-infusion mass spectrometry," Energy Fuels, 2015, 29(10):6443-6449.

Clark et al., "First principles methods using CASTEP," Z. Kristallogr., 2005, 220:567-570.

(56) References Cited

OTHER PUBLICATIONS

Cox et al., "Universal Method to Measure Water Infiltration into Asphalt Pavements Independent of Pavement Preservation Surface Treatment," Transportation Research Record, 2018, 2672(12):40-50.

csx.com [online], "How does road salt work?" available on or before Jan. 8, 2019, via Internet Archive: Wayback Machine URL <http://web.archive.org/web/20190108041135/https://www.csx.com/index.cfm/library/files/customers/commodities/minerals/how-does-road-salt-work/>, retrieved on May 28, 2021, URL <https://www.csx.com/index.cfm/library/files/customers/commodities/minerals/how-does-road-salt-work/>, 1 page.

Cuadriet al., "Chemically modified bitumens with enhanced rheology and adhesion properties to siliceous aggregates," Construction and Building Materials, 2015, 93:766-774.

Curtis et al., "Fundamental Properties of Asphalt-Aggregate Interactions Including Adhesion and Absorption," SHRP-A-341, Strategic Highway Research Program (SHRP) National Research Council, Dec. 1993, 614 pages.

Dandamudi et al., "Co-liquefaction of mixed culture microalgal strains under sub-critical water conditions," Bioresource Technology, 2017, 236:129-137.

Dandamudi et al., "Hydrothermal liquefaction of Cyanidioschyzon merolae and Salicornia bigelovii Torr.: The interaction effect on product distribution and chemistry," Fuel, 2020, 277:118146, 11 pages.

de Carteret et al., "Effect, of Naturally Occurring Salts on Tensile and Shear Strength of Sealed Granular Road Pavements," J. Mater. Civ. Eng., 2014, 26(6):04014010, 13 pages.

De Luca et al., "«Cyanidioschyzon merolae»: a new alga of thermal acidic environments," Webbia, 1978, 33(1):37-44.

De Proft et al., "Calculation of negative electron affinity and aqueous anion hardness using Kohn-Sham HOMO and LUMO energies," Faraday Discuss., 2007, 135:151-159.

De Proft et al., "Conceptual and computational DFT in the study of aromaticity," Chemical Reviews, 2001, 101(5):1451-1464.

Delley, "From Molecules to Solids with the DMol3 Approach," J. Chem. Phys., 2000, 113:7756-7764.

Dickie et al., "Macrostructures of the asphaltic fractions by various instrumental methods," Analytical Chemistry, 1967, 39(14):1847-1852.

Dinh et al., "Effect of rejuvenators on the crack healing perfonnance of recycled asphalt pavement by induction heating," Construction and Building Materials, 2018, 164:246-254.

Dong et al., "The Effect of Water on Pavement Response Based on 3D FEM Simulation and Experiment Evaluation," Symposium on Pavement Mechanics and Materials 2007, Blacksburg, Virginia, Jun. 3-6, 2007; Pavements and Materials, 2008, pp. 34-44.

Dugan et al. "Rheology of Virgin Asphalt Binder Combined with High Percentages of RAP Binder Rejuvenated with Waste Vegetable Oil," ACS Omega, 2020, 5:15791-15798.

El Halim et al., "Stripping Distress on Hot Mixed Asphalt Pavement," Global Research and Development Journal for Engineering, Mar. 2016, pp. 66-70.

Fan et al., "Multiscale understanding of interfacial behavior between bitumen and aggregate: From the aggregate mineralogical genome aspect," Construction and Building Materials, 2021, 271:121607, 11 pages.

fhwa.dot.gov [online] "Highway Statistics 2017," 2018, retrieved on Feb. 2, 2023, retrieved from URL <https://www.fhwa.dot.gov/policyinformation/statistics/2017/>, 9 pages.

Fini et al., "Active Mineral Fillers Arrest Migrations of Alkane Acids to the Interface of Bitumen and Siliceous Surfaces," ACS Sustainable Chem. Eng., 2019, 7:10340-10348.

Fini et al., "Chemical characterization of biobinder from swine manure: Sustainable modifier for asphalt binder," J. Mater. Civ. Eng., 2011, 23(11):1506-1513.

Fini et al., "Investigating the aging susceptibility of bio-modified asphalts," Airfield and Highway Pavements, 2015, pp. 62-73.

Fini et al., "Moisture Damage and Its Relation to Surface Adsorption/Desorption of Rejuvenators," Ind. Eng. Chem. Res., 2020, 59(30):13414-13419.

Fini et al., "Role of Chemical Composition of Recycling Agents in Their Interactions with Oxidized Asphaltene Molecules," J. Mater. Civ. Eng., 2020, 32(9):04020268, 13 pages.

Ford et al., "Quantitative Evaluation of Stripping by the Surface Reaction Test," 53rd Annual Meeting of the Highway Research Board. Washington D.C., Jan. 21-25, 1974; Transportation Research Record, 1974, 515:40-54.

Gao et al., "Impact of minerals and water on bitumen-mineral adhesion and debonding behaviours using molecular dynamics simulations," Construction and Building Materials, 2018, 171:214-222.

Gao et al., "Molecular dynamics investigation of interfacial adhesion between oxidised bitumen and mineral surfaces," Applied Surface Science, 2019, 479:449-462.

Geerlings et al., "Conceptual density functional theory," Chemical Reviews, 2003, 103(5):1793-1873.

Geerlings et al., "Conceptual DFT: Chemistry from the linear response function," Chemical Society Reviews, 2014, 43(14):4989-5008.

Giani et al., "Comparative life cycle assessment of asphalt pavements using reclaimed asphalt, warm mix technology and cold in-place recycling," Resources, Conservation and Recycling, 2015, 104:224-238.

Glover et al., "Development of a new method for assessing asphalt binder durability with field validation," Texas Dept. Transport., 2005, Report 1872-2, 334 pages.

Grenfell et al., "Assessing Asphalt Mixture Moisture Susceptibility through Intrinsic Adhesion, Bitumen Stripping, and Mechanical Damage," Road Materials and Pavement Design, 2014, 15(1):131-152.

Grimme, "Density functional theory with London dispersion corrections," WIREs Comput. Mol. Sci., 2011, 1:211-228.

Hassan et al., "Effects of Runway Deicers on Pavement Materials and Mixes: Comparison with Road Salt," J. Transp. Eng., Jul. 2002, 128(4):385-391.

Hicks et al., "Introduction and Seminar Objectives," Transportation Research Board National Seminar, San Diego, CA, Feb. 4-6, 2003; Moisture Sensitivity of Asphalt Pavements: A National Seminar, 2003, pp. 3-20.

Hirooka et al., "Cultivation of Acidophilic Algae Galdieria sulphuraria and *Pseudochlorella* sp. YKT1 in Media Derived from Acidic Hot Springs," Frontiers in Microbiology, Dec. 2016, 7:2022, 11 pages.

Hong Kong Meteorological Society, "Acid Rain Survey," HKMetS, 2003, Bulletin, 13(1/2), 44 pages.

Hossain et al., "Quantifying moisture damage at mastic-aggregate interface," International Journal of Pavement Engineering 2014, 15(2):174-189.

Hossain et al., "Optimum winter road maintenance: effect of pavement types on snow melting performance of road salts," Can. J. Civ. Eng., Aug. 2016, 43:802-811.

Hosseinnezhad et al., "Multi-scale Evaluation of Moisture Susceptibility of Bio-Modified Bitumen," ACS Applied Bio Materials, 2019, 2:5779-5789.

Howard [online], "The Surprising History of Road Salt," Feb. 14, 2014, retrieved on May 28, 2021, retrieved from URL <https://news.nationalgeographic.com/news/2014/02/140212-road-salt-shortagesmelting-ice-snow-science/>, 12 pages.

Huang et al., "Impact of Water on Asphalt Aging," Transportation Research Record: Journal of the Transportation Research Board, 2012, 2293:63-72.

Hung et al. "Effects of water exposure on bitumen surface microstructure," Construction and Building Materials, 2017, 135:682-688.

Hung et al., "Absorption spectroscopy to determine the extent and mechanisms of aging in bitumen and asphaltenes," Fuel, 2019, 242:408-415.

Hung et al., "Preventing Assembly and Crystallization of Alkane Acids at Silica-Bitumen Interface to Enhance Interfacial Resistance to Moisture Damage," Ind. Eng. Chem. Res, 2019, 58(47):21542-21552.

(56) References Cited

OTHER PUBLICATIONS

Ibrahim Al Helo et al., "Tensile Strength for Mixture Content Reclaimed Asphalt Pavement," Global Journal of Engineering Science and Research Management, Nov. 2016, 3(11):26-34.

Ji et al., "Effectiveness of vegetable oils as rejuvenators for aged asphalt binders," J. Mater. Civ. Eng., 2017, 29(3):D4016003, 10 pages.

Kakar et al., "A review on moisture damages of hot and warm mix asphalt and related investigations," Journal of Cleaner Production, 2015, 99:39-58.

Kandhal et al., "Aggregate Tests Related to Asphalt Concrete Performance in Pavements," NCHRP Report 405, Transportation Research Board, 1998, 114 pages.

Kandhal et al., "Tests for Plastic Fines in Aggregates Related to Stripping in Asphalt Paving Mixtures," NCAT Report No. 98-3, National Center for Asphalt Technology of Auburn University, Mar. 1998, 17 pages.

Karnati et al., "Surface functionalization of silica nanoparticles to enhance aging resistance of asphalt binder," Construction and Building Materials, 2019, 211:1065-1072.

Kim et al., "Modeling of tensile strength on moist granular earth material at low water content," Engineering Geology, 2003, 69:233-244.

Lachance-Tremblay et al., "Camparison of the moisture damage of bituminous binder coupled with glass and limestone substrate using pull off test," Can. J. Civ. Eng., 2019, 46:188-194.

Lam et al. "Microwave vacuum pyrolysis of waste plastic and used cooking oil for simultaneous waste reduction and sustainable energy conversion: Recovery of cleaner liquid fuel and techno-economic analysis," Renewable and Sustainable Energy Reviews, 2019, 115:109359, 13 pages.

Lee et al., "Development of the Colle-Salvetti correlation-energy formula into a functional of the electron density," Phys. Rev. B, Jan. 1988, 37(2):785-789.

Lee et al., "TR 693—Development of Quality Standards for Inclusion of High Recycled Asphalt Pavement Content in Asphalt Mixtures—Phase III," Iowa Highway Research Board, May 2018, 74 pages.

Lei et al., "Effect of bio-based and refined waste oil modifiers on low temperature performance of asphalt binders," Construction and Building Materials, 2015, 86:95-100.

Leite et al., "Evaluation of the UV aging tests effect on asphalt binders using Glover Rowe parameter," Proceedings of the 13th International Conference on Asphalt Pavements, 2018, 6 pages.

Li et al., "Chemical compositions of improved model asphalt systems for molecular simulations," Fuel, 2014, 115:347-356.

Liu et al., "Examination of Moisture Sensitivity of Aggregate-Bitumen Bonding Strength using Loose Asphalt Mixture and Physico-Chemical Surface Energy Property Tests," International Journal of Pavement Engineering, 2014, 15(7):657-670.

Ma et al., "Potential of recycled concrete aggregate pretreated with waste cooking oil residue for hot mix asphalt," Journal of Cleaner Production, 2019, 221:469-479.

Mahari et al. "Production of value-added liquid fuel via microwave co-pyrolysis of used frying oil and plastic waste," Energy, Aug. 2018, 162: 309-317.

Minowa et al., "Oil production from algal cells of Dunaliella tertiolecta by direct thermochemical liquefaction," Fuel, 1995, 74(12):1735-1738.

Mirhosseini et al., "Performance evaluation of asphalt mixtures containing high-RAP binder content and bio-oil rejuvenator," Construction and Building Materials, 2019, 227:116465, 9 pages.

Mohammad et al., "Laboratory Evaluation of Asphalt Mixtures Containing Biobinder Technologies," Transportation Research Record: Journal of the Transportation Research Board, 2013, 2371:58-65.

Mousavi et al., "Moderating Effects of Paraffin Wax on Interactions between Polyphosphoric Acid and Bitumen Constituents," ACS Sustainable Chem. Eng., 2019,7:19739-19749.

Mousavi et al., "Using Fundamental Material Properties to Predict the Moisture Susceptibility of the Asphalt Binder: Polarizability and a Moisture-Induced Shear-Thinning Index," ACS Appl. Bio Mater., 2020, 3:7399-7407.

Mullins, "The Modified Yen Model," Energy Fuels, 2010, 24:2179-2207.

nadp.slh.wisc.edu [online], "Acid Rain," available on or before Aug. 23, 2019, via Internet Archive: Wayback Machine URL <http://web.archive.org/web/20190823203547/http://nadp.slh.wisc.edu/educ/acidrain.aspx>, retrieved on Feb. 14, 2020, URL <http://nadp.slh.wisc.edu/educ/acidrain.aspx>, 4 pages.

ncdc.noaa.gov [online] "National Climate Report—Annual 2017," available on or before Jan. 16, 2018, via Internet Archive: Wayback Machine URL <http://web.archive.org/web/20180116201413/https://www.ncdc.noaa.gov/sotc/national/201713>, retrieved on Jan. 20, 2023, URL <https://www.ncdc.noaa.gov/sotc/national/201713>, 36 pages.

Obando et al., "Paper No. 20-06022: Effect of Composition of Water on Accelerating Moisture Damage in Pavement," Abstract, presented at 99th Annual Transportation Research Board Annual Meeting, Washington DC., Jan. 11-15, 2020, 2 pages.

Obando, "Influence of water in the performance of road surface: acid rain," Investigación e Innovación en Ingenierias, Aug. 2017, 5(2):190-207 (with English abstract).

Oldham et al., "Investigating Change of Polydispersity and Rheology of Crude Oil and Bitumen Due to Asphaltene Oxidation," Energy Fuels, 2020, 34:10299-10305.

Oldham et al., "Reducing Susceptibility to Moisture Damage in Asphalt Pavements Using Polyethylene Terephthalate and Sodium Montmorillonite Clay," Constr. Build. Mater., 2021, 269:121302, 12 pages.

Oldham et al., "Transesterification of Waste Cooking Oil to Produce a Sustainable Rejuvenator for Aged Asphalt," Resources, Conservation and Recycling, 2021, 168:105297, 8 pages.

Oldham, "Implications of Bio-modification on Moisture Damage Mechanisms in Asphalt Binder Matrix," Dissertation for the degree of Doctor of Philosophy, Arizona State University, May 2020, 214 pages.

Pahlavan et al., "Evolution of Molecular Packing and Rheology in Asphalt Binder during Rejuvenation," Fuel, 2018, 222:457-464.

Parr et al., "Density-functional theory of the electronic structure of molecules," Annu. Rev. Phys. Chem., 1995, 46(1):701-728.

Patil et al., "Biodiesel Production from Waste Cooking Oil Using Sulfuric Acid and Microwave Irradiation Processes," Journal of Environmental Protection, 2012, 3:107-113.

Patil et al., "Power dissipation in microwave-enhanced in situ transesterification of algal biomass to biodiesel," Green Chemistry, 2012, 14(3):809-818.

Payne et al., "Iterative minimization techniques for ab initio total-energy calculations: molecular dynamics and conjugate gradients," Reviews of Modern Physics, 1992, 64(4):1045-1098.

Perdew et al., "Generalized Gradient Approximation Made Simple," Phys Rev Lett, 1996, 77(18):3865-3868.

Pernyeszi et al., "Sorption and elution of asphaltenes from porous silica surfaces," Colloids and Surfaces A: Physicochemical and Engineering Aspects, 2001, 194:25-39.

Petersen et al., "Asphalt Aging: Dual Oxidation Mechanism and Its Interrelationships with Asphalt Composition and Oxidative Age Hardening," Paper No. 98-0289, Transportation Research Record, 1998, 1638:47-55.

Prafulla et al., "Biodiesel production from waste cooking oil using sulfuric acid and microwave irradiation processes," Journal of Environmental Protection, 2012, 3(1):107-113.

Rabelo et al., "FTIR analysis for quantification of fatty acid methyl esters in biodiesel produced by microwave-assisted transesterification," International Journal of Environmental Science and Development, 2015, 6(12):964-969.

Rajib et al., "Do all rejuvenators improve asphalt performance?" Road Materials and Pavement Design, 2020, 20 pages.

Rajib et al., "Enhancing Biomass Value Chain by Utilizing Biochar as a Free Radical Scavenger to Delay Ultraviolet Aging of Bituminous Composites Used in Outdoor Construction," Resources, Conservation and Recycling, 2021, 168:105302, 9 pages.

(56) References Cited

OTHER PUBLICATIONS

Rajib et al., "Inherently Functionalized Carbon from Lipid and Protein-Rich Biomass to Reduce Ultraviolet-Induced Damages in Bituminous Materials," ACS Omega, 2020, 5:25273-25280.
Rajib et al., "Investigating Molecular-Level Factors That Affect the Durability of Restored Aged Asphalt Binder," Journal of Cleaner Production, 2020, 270:122501, 11 pages.
Raouf et al., "Rheology of fractionated cornstover bio-oil as a pavement material," International Journal of Pavements, 2010, 9(1-2-3):58-69.
Sablon et al., "Computing Fukui functions without differentiating with respect to electron No. II. Calculation of condensed molecular Fukui functions," J. Chem. Phys., 2007, 126(22):224108-1-224108-6.
Samieadel et al., "Improved receycled asphalt using sustainable hybrid rejuvenators with enhanced intercalation into oxidized asphaltenes nanoaggregates," Construction and Building Materials, 2020, 262:120090, 11 pages.
Samieadel et al., "Investigating Molecular Conformation and Packing of Oxidized Asphaltene Molecules in Presence of Paraffin Wax," Fuel, 2018, 220:503-512.
Setiadji et al., "Effect of chemical compounds in tidal water on asphalt pavement mixture," International Journal of Pavement Research and Technology, 2017, 10:122-130.
Shen et al., "Effects of rejuvenator on performance-based properties of rejuvenated asphalt binder and mixtures," Constr. Build. Mater., 2007, 21:958-964.
Silva et al., "Are totally recycled hot mix asphalts a sustainable alternative for road paving?" Resources, Conservation and Recycling, 2012, 60:38-48.
Solaimanian et al., "Improved Conditioning and Testing Procedures for HMA Moisture Susceptibility," NCHRP Report 589, Transportation Research Board, 2007, 78 pages.
Solaimanian et al., "Test methods to predict moisture sensitivity of hot-mix asphalt pavements," Moisture Sensitivity of Asphalt Pavements: A National Seminar, Transportation Research Board, San Diego, CA, Feb. 4-6, 2003, 38 pages.
Sun et al., "Properties of asphalt binder modified by bio-oil derived from waste cooking oil," Construction and Building Materials, 2016, 102:496-504.
Tayh et al., "An overview of utilization of bio-oil in hot mix asphalt," WALLA Journal, Jan. 2014, 30(S3):131-141.
Terrel et al., "Water sensitivity of asphalt-aggregate mixes: test selection," Report SHRP-A-403, Strategic Highway Research Program, Jun. 1994, 194 pages.
Vardon et al., "Chemical properties of biocrude oil from the hydrothermal liquefaction of Spirulina algae, swine manure, and digested anaerobic sludge," Bioresource Technology, 2011, 102(17):8295-8303.
Wang et al., "Investigation on snow-melting performance of asphalt mixtures incorporating with salt-storage aggregates," Construction and Building Materials, Mar. 2017, 142:187-198.
Watanabe et al., "Decomposition of a long chain saturated fatty acid with some additives in hot compressed water," Energy Conversion and Management, 2006, 47(18-19):3344-3350.
Wen et al., "Laboratory evaluation of waste cooking oil-based bioasphalt as an alternative binder for hot mix asphalt," Journal of Materials in Civil Engineering, 2013, 25(10):1432-1437.
Williams et al., "Asphalt Pavement Industry Survey on Recycled Materials and Warm-mix Asphalt Usage: 2017," Information Series 138—Executive Summary, National Asphalt Pavement Association 8th Annual Survey, 2017, 3 pages.
Williams et al., "Asphalt Pavement Industry Survey on Recycled Materials and Warm-Mix Asphalt Usage: 2018," Information Series 138, National Asphalt Pavement Association Final Report, FHWA-HICP-40, Sep. 2019, 46 pages.
Xiu et al., "Hydrothermal pyrolysis of swine manure to bio-oil: effects of operating parameters on products yield and characterization of bio-oil," Journal of Analytical and Applied Pyrolysis, 2010, 88(1):73-79.
Xiu et al., "Pyrolysis and combustion characteristics of Bio-oil from swine manure," J Therm Anal Calorim, 2012, 107(2):823-829.
Xu et al., "Molecular dynamics study of interfacial mechanical behavior between asphalt binder and mineral aggregate," Construction and Building Materials, 2016, 121:246-254.
Xue et al., "Accelerated Damage Testing Method for Evaluating the Service Performance of Asphalt Pavement Affected by Acid Rain," American Society of Civil Engineers, 2016, pp. 117-124.
Yan et al., "Study on bond properties between RAP aggregates and virgin asphalt using Binder Bond Strength test and Fourier Transform Infrared spectroscopy," Construction and Building Materials, 2016, 124:1-10.
Yang et al., "Analysis of energy conversion characteristics in liquefaction of algae," Resources, Conservation and Recycling, 2004, 43(1):21-33.
Yang et al., "Environmental and economic analyses of recycled asphalt concrete mixtures based on material production and potential performance," Resources, Conservation and Recycling, 2015, 104:141-151.
Yang et al., "Mechanical performance of asphalt mixtures modified by bio-oils derived from waste wood resources," Construction and Building Materials, 2014, 51:424-431.
Yang et al., "Performance evaluation of asphalt binder modified by bio-oil generated from waste wood resources," Int. J. Pavement Res. Technol., 2013, 6(4):431-439.
You et al., "Evaluation of low-temperature binder properties of warm-mix asphalt, extracted and recovered RAP and RAS, and bioasphalt," J. Mater. Civ. Eng., 2011, 23(11):1569-1574.
Yuan et al., "Relationship among cohesion, adhesion, and bond strength: From multi-scale investigation of asphalt-based composites subjected to laboratory-simulated aging," Materials & Design, 2020, 185:108272, 13 pages.
Zalghout, "Laboratory and Field Evaluation of Plant Produced Asphalt Mixtures Containing RAP in Hot Climate Areas," Thesis for the degree of Master of Science, Arizona State University, Aug. 2019, 179 pages.
Zaumanis et al., "Influence of six rejuvenators on the performance properties of Reclaimed Asphalt Pavement (RAP) binder and 100% recycled asphalt mixtures," Construction and Building Materials, 2014, 71:538-550.
Zhang et al., "Analysis of the relationships between waste cooking oil qualities and rejuvenated asphalt properties," Materials, 2017, 10(5):508, 16 pages.
Zheng et al., "Microscopic adhesion properties of asphalt-mineral aggregate interface in cold area based on molecular simulation technology," Construction and Building Materials, 2021, 268:121151, 13 pages.
Ziari et al., "Evaluatian of perfarmance properties of 50% recycled asphalt mixtures using three types of rejuvenators," Petroleum Science and Technology, 2019, 9 pages.

\* cited by examiner

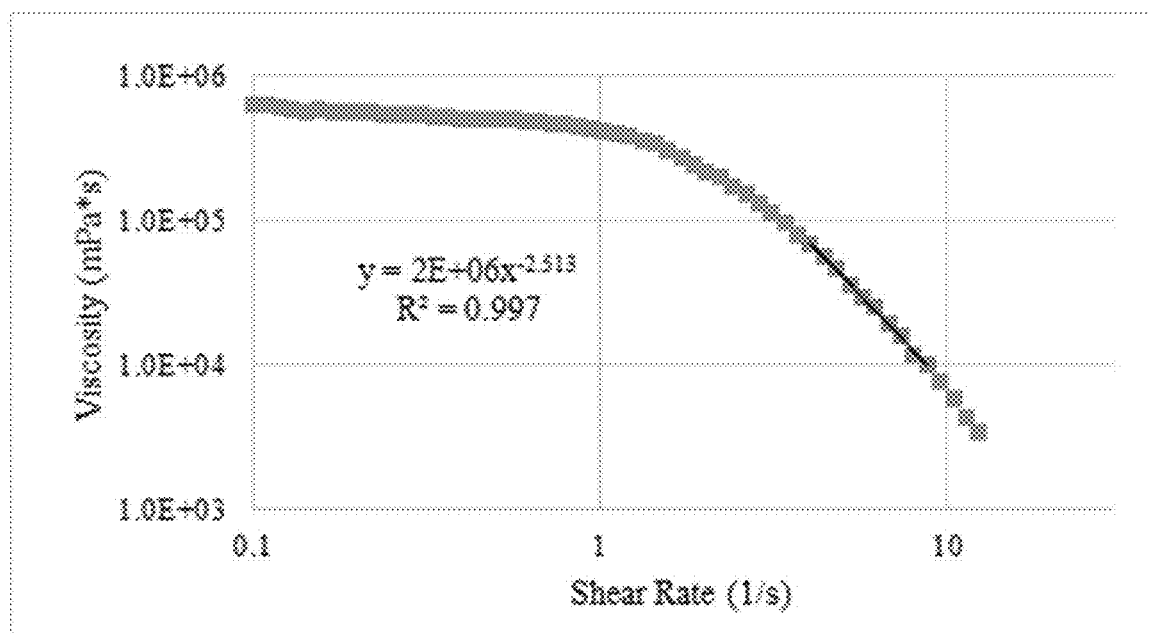

EVALUATING CHANGES IN BONDING INTERACTIONS BETWEEN INCLUSIONS AND A THERMOPLASTIC MATRIX

CROSS-REFERENCE TO RELATED APPLICATIONS

This application claims the benefit of U.S. Patent Application No. 62/971,402 filed on Feb. 7, 2020, and U.S. Patent Application No. 63/146,245 filed on Feb. 5, 2021, both of which are incorporated herein by reference in their entirety.

STATEMENT OF GOVERNMENT INTEREST

This invention was made with government support under 1928795, 1928807, and 1935723 awarded by the National Science Foundation. The government has certain rights in the invention.

TECHNICAL FIELD

This invention relates to assessing changes in bonding interactions between inclusions and a thermoplastic material in a composite.

BACKGROUND

Changes in interactions between inclusions and a thermoplastic matrix, such as changes in bond strength between bitumen and stone aggregates, can be difficult to assess. For asphalt pavement, commonly used tests include analysis of stone aggregate alone, loose mixtures, compacted mixtures, or asphalt binder alone. Such tests can present challenges related to repeatability and sample preparation.

SUMMARY

This disclosure describes evaluating changes in bonding interactions between inclusions and a thermoplastic matrix. Sample preparation methods as well as test method sequences are described. The tests involve small samples and quick sample preparation, and results show relatively low coefficients of variation. The tests can be performed in a lab, during quality control, quality assurance, or both to ensure the thermoplastic materials (e.g., bitumen used in roadways) are not susceptible to a variety of conditioning factors.

In a first general aspect, assessing an interaction between solid particles and a thermoplastic material in which the solid particles are dispersed includes combining a thermoplastic material with a multiplicity of solid particles to yield a heterogeneous mixture, processing the heterogeneous mixture to yield an unconditioned sample, conditioning the unconditioned sample to yield a conditioned sample, subjecting the conditioned sample to a ramping shear rate from an initial shear rate to a final shear rate, assessing a viscosity of the conditioned sample at a plurality of shear rates between the initial shear rate and the final shear rate, and assessing a value of a slope of a shear-thinning region for the unconditioned sample using a power-law equation.

Implementations of the first general aspect may include one or more of the following features.

Some implementations include subjecting the unconditioned sample to a ramping shear rate from the initial shear rate to the final shear rate, assessing a viscosity of the unconditioned sample at a plurality of shear rates between the initial shear rate and the final shear rate, and assessing a value of a slope of a shear-thinning region for the conditioned sample using a power-law equation. Some implementations include assessing a difference between the value of the slope of the shear-thinning region for the unconditioned sample and the value of the slope of the shear-thinning region for the conditioned sample. Some implementations include identifying, for a non-zero difference, a susceptibility of thermoplastic material to the conditioning, wherein the susceptibility corresponds to a change in bond strength between the solid particles and the thermoplastic material.

In some implementations, processing the heterogeneous mixture includes heating the heterogeneous mixture. Conditioning the unconditioned sample can include aging the unconditioned sample, subjecting the unconditioned sample to a freeze-thaw cycle, exposing the unconditioned sample to a liquid (e.g., for a length of time between 2 hours and 48 hours). The liquid can include an aqueous solution (e.g., an acidic solution having a pH less than 5), a solvent, or an oil. In some cases, the liquid includes an aqueous solution with one or more of salt, carbon dioxide, sulfur dioxide, and nitrogen oxide.

Some implementations include adjusting the viscosity of the conditioned sample to an initial viscosity before assessing the viscosity of the conditioned sample at the plurality of shear rates. Adjusting the viscosity of the conditioned sample can include heating the conditioned sample. In one example, the initial viscosity is about 1000 Pa·s.

In some implementations, the thermoplastic matrix includes bitumen, the solid particles includes glass beads, or both. Combining the thermoplastic material with the multiplicity of solid particles can include forming a composite with the multiplicity of solid particles dispersed in a matrix of the thermoplastic material. Processing the heterogeneous mixture to yield an unconditioned sample can include molding the unconditioned sample into a selected shape and size.

Tests described herein can be used advantageously to evaluate a change in bond strength as materials age or are subjected to environmental conditions, such as exposure to water. Tests described herein can also be used advantageously to screen for bitumens that are prone to moisture damage (e.g., for quick screening by formulators in an effort to enhance their recipe). Tests described herein can also be used advantageously to compare the role of commercial additives used to increase the moisture resistance of bitumen, and to screen for solvents that can effective for removal of crude oil from stones (e.g., in oil recovery).

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 1 shows viscosity versus shear rate for determining the slope of a shear-thinning region.

DETAILED DESCRIPTION

Test methods to evaluate a change in bond strength between inclusions and a thermoplastic matrix are described. As used herein, "inclusions" generally refer to a multiplicity of solid particles. Examples of thermoplastics include acrylic, acrylonitrile butadiene styrene, nylon, polylactic acid, polybenzimidazole, polycarbonate, polyether sulfone, polyoxymethylene, polyether ether ketone, polyetherimide, polyethylene, polyphenylene oxide, polyphenylene sulfide, polypropylene, polystyrene, polyvinyl chloride, polyvinylidene fluoride, polytetrafluoroethylene, and high molecular weight residues from petroleum distillation (e.g., bitumen). The inclusions and the thermoplastic matrix form an inhomogeneous composite. One example of such an inhomogeneous composite is a bituminous composite with stone aggregates (e.g., siliceous stone aggregates). The test methods can be used to assess the susceptibility of the composite to conditioning based on fundamental material properties. Examples of conditioning include aging the composite, subjecting the composite to freeze-thaw cycles, exposing the composite to environmental factors such as heat or moisture, or any combination thereof. The tests are designed to decouple interface properties of the thermoplastic matrix from bulk properties of the thermoplastic matrix. The capability of the test to detect any changes at the interface is demonstrated by changing the surface properties of the inclusions, altering the interfacial bond.

One property measured as an indicator of moisture damage is the shear thinning of a composite. Moisture damage can be caused by water molecules replacing the thermoplastic matrix at an interface between the thermoplastic matrix and the inclusions, weakening the interfacial bond. In one example, acidic compounds have preferential adsorption to mineral surfaces and can supersede other molecules to reach and adsorb to the surface of an inclusion. Acidic compounds are also prone to hydrolysis and easily become displaced by water molecules in a wet environment, giving rise to moisture damage. As the inclusion surface becomes coated by water displacing formerly adsorbed molecules of the thermoplastic matrix, the surface chemistry of the silica changes; this in turn alters the extent of shear thinning of the composite. Shear thinning is measured by applying a shear rate sweep (0.1-100 l/s) on the composite. DeltaST is defined as the absolute value of the difference between two measurements: the shear-thinning value measured on a dry sample, and the shear-thinning value measured on a wet (water-conditioned) sample. In a sample that is completely moisture-resistant, the DeltaST will be zero, indicating no changes due to water conditioning. The size of DeltaST indicates the degree of susceptibility to moisture damage: a larger DeltaST indicates more susceptibility of the thermoplastic to moisture damage.

The tests have been developed to detect bitumens with high amounts of acidic, water-soluble compounds. Since siliceous stones are highly susceptible to moisture damage, the test can be used to detect susceptible bitumens using standard glass beads as stone surrogates for the nucleation of acids. Displacement of nucleated acids by water is then captured by the test as a change in shear thinning. Thus, non-durable combinations of bitumens and siliceous stones can be detected by providing a tool to characterize them based on their susceptibility to moisture damage.

Assessing the effects of conditioning on a composite includes preparing a sample and testing properties of the sample. The sample is prepared by blending a thermoplastic material with a substrate to which the thermoplastic material adheres. One example of a thermoplastic material is bitumen. Suitable substrates include glass beads. The sample is heated and can be cast into a mold to ensure uniform size for test measurement. Multiple samples can be cast, and each test can include multiple samples of the same composition. Some samples (unconditioned samples) are left untreated, while some samples (conditioned samples) are conditioned. Conditioning can include aging, exposing the sample to freeze-thaw cycles, exposing the sample to heater or moisture, or any combination thereof. In one example, conditioning a sample includes exposing the sample to an aqueous conditioning fluid. In some cases, the aqueous conditioning fluid is water. In certain cases, the aqueous conditioning fluid includes salt, carbon dioxide, sulfur dioxide, nitrogen oxide, or any combination thereof. The aqueous conditioning fluid can be acidic (e.g., pH less than 7, less than 6, less than 5, or less than 4). Conditioning the sample can include immersion in the aqueous conditioning fluid for a length of time (e.g., a day). In certain cases, conditioning the samples includes subjecting the samples to moisture damage following AASHTO T283 using the freeze-thaw procedure.

The samples are subjected to a shear rate sweep test (e.g., 0.1-100 l/s). The shear rate sweep test can be applied using a dynamic shear rheometer (e.g., 8-mm parallel plate assembly). To determine a change in shear thinning (DeltaST), the slope of the shear-thinning region is determined for unconditioned samples and conditioned samples using a power-law equation, as shown in FIG. 1. The DeltaST is then calculated as the absolute value of the difference between the shear-thinning value of the unconditioned sample and the shear-thinning value of the conditioned sample.

The interaction of the inclusions with the thermoplastic matrix is impacted by the surface properties of the inclusions, which play a role in the strength of the interfacial bond. Shear thinning is highly sensitive to the change of interfacial bond. Displacement of the thermoplastic material at the interface between the inclusions between the thermoplastic material changes the interfacial bond between the thermoplastic material and the inclusions. The shear-thinning value allows detection of changes in the interfacial bond: a DeltaST value of zero indicates no change at the interface due to conditioning, and a DeltaST value above zero is indicative of conditioning causing changes at the interface.

The following sections provide examples including the use of the DeltaST test to compare the shear-thinning values of various bituminous composites in dry conditions and in wet conditions as a measure of susceptibility to moisture damage.

Examples

Materials

Mixtures.

This example utilizes a mixture containing 15% reclaimed asphalt pavement (RAP) manufactured by Southwest Asphalt, a Division of Fisher Sand & Gravel Co. The mixtures were placed by the City of Phoenix, Ariz. and were sampled in-situ from three different trucks. Table 1 shows the gradation for both Control and RAP mixtures. Both mixes contained 1.1% of hydrated lime with a specific gravity of 2.2.

TABLE 1

Gradation of Aggregate within the Asphalt Mixtures

| | Passing (%) | |
|---|---|---|
| Sieve US-mm | City of Phoenix Mix Design Target | Production Limits |
| 1" - 25.0 | 100 | |
| 3/4" - 19.0 | 95 | 88-100 |
| 1/2" - 12.50 | 85 | 78-92 |
| 3/8" - 9.50 | 75 | 68-82 |
| #4 - 4.75 | 58 | 51-65 |
| #8 - 2.36 | 44 | 39-49 |

TABLE 1-continued

Gradation of Aggregate within the Asphalt Mixtures

| Sieve US-mm | City of Phoenix Mix Design Target | Passing (%) Production Limits |
|---|---|---|
| #30 - 0.600 | 24 | 19-29 |
| #200 - 0.075 | 4.0 | 2.0-6.0 |

The procedure for compacting the samples included taking equal portions of each truck mix and thoroughly blending the materials together. Afterwards, the blended samples were placed in the oven for 1 hour at 150° C. to reach compaction temperature.

Asphalt Binders.

The control binder for this study was a PG 70-10 provided by Western Refining located in Phoenix, Ariz. Binder was also acquired by extracting the 15% RAP field produced mixtures according to ASTM D5404 using a BUCHI Rotavapor R-300. The 15% RAP mixtures had approximately 88.4% virgin PG 70-10 by weight. The specific gravities of binders are 1.021 and 1.050 at 25° C. for control and 15% RAP, respectively.

Preparation of Conditioning Water (Salty and Acidic Water).

To simulate field saltwater conditions, tap water was blended with 24% rock salt with a resulting pH of 7.6. Rock salt is one of the most common types of salt used to melt snow on the pavements in the US. The percentage of rock salt was defined according to the standards used by contractors in the US. To dissolve the rock salt in the water, the mix was hand-blended for 10 minutes.

Acidic water was studied as a representative of low pH water and those of acid rain. Acid rain are carbon dioxide ($CO_2$), nitrogen oxide (NO), and sulfur dioxide ($SO_2$). Among these three, $CO_2$ contributes the most to the acidity of rainwater. Therefore, to simulate the effect of acid rain, compressed $CO_2$ was pumped into a container filled with distilled water until water pH dropped to 3.5. The distilled water selected had a pH of 6.8.

Given the initial loss of some of the $CO_2$ due to its phase separation from water, all tests with acidic water were performed with a final pH of 3.6 rather than 3.5.

Asphalt Mastic Preparation.

To understand the interaction of the asphalt binder with siliceous aggregates, fine glass beads (100 micron) were blended with the asphalt binder at a concentration of 50% by weight of asphalt binder. To prepare the mastic, the glass beads were hand-blended with bitumen at 155° C. for 5 minutes.

Methods

Tensile Strength Ratio (TSR).

Specimens were obtained after coring and cutting a gyratory to a height of 180 mm and a diameter of 100 mm rather than being tested uncut. The samples were subjected to moisture damage following AASHTO T283 including the freeze-thaw procedure. After vacuum saturation was performed to obtain the required saturation level, the samples were placed in a freezer at 18° C. for 16 h, followed by a water bath at 60° C. for 24 h, then another water bath at 25° C. for 2 hours. This was performed using tap water, acidic, and salty water. To prevent contamination, water conditioning was performed in glass jars placed in the water bath. The indirect tensile strength was measured using an IPC T-100 Universal Testing Machine (U™). The tensile strength ratio (TSR) was calculated using Equation 1, where $S_{tw}$ is average tensile strength of the conditioned subset, and $S_{td}$ is the average tensile strength of the unconditioned subset.

$$TSR = S_{tw}/S_{td} \tag{1}$$

Binder Bond Strength (BBS) Test.

The pull off tensile strength of asphalt binder from a siliceous surface was measured and determined via the bitumen bond strength test according to AASHTO TP 91. In order to have a consistent surface for testing and one composed of $SiO_2$, the substrate chosen was glass. The testing apparatus was the PATTI Quantum Gold Model which was calibrated before each testing set to a loading rate of 100 psi/second. The pull-off strength moisture susceptibility index (POSMSI) was calculated based on Equation 2, where $Wet_{pos}$ refers to wet pull off strength and $Dry_{pos}$ refers to dry pull off strength.

$$POSMSI = (Wet_{oos} - Dry_{pos}) \cdot 100\%/Dry_{pos} \tag{2}$$

Shear Rate Test (SRT).

The change in viscosity was observed under a ramping shear rate from 0.1 to 420 1/s to observe the transition from zero shear viscosity to shear-thinning. The testing temperature was adjusted to accommodate an initial viscosity of approximately 1000 Pa·s which is considered to be an optimal viscosity range for observing shear thinning behavior. The instrument utilized was an Anton Parr MCR 302 dynamic shear rheometer; the test was performed using 8 mm parallel plates. 5 replicates were tested, and the average of three was reported.

Contact Angle (CA).

The susceptibility of the asphalt binder to stripping was observed by measuring the contact angle of asphalt binder on a glass slide before and after water conditioning. The substrate used was a glass as a surrogate for siliceous stone aggregates. The substrates were chemically cleaned using acetone, isopropanol, and water followed by 15 minutes in the UV-Ozone cleaner. Moisture conditioning occurred at 80° C. for 2 hours followed by drying via nitrogen gas. Measurements were taken using a Rame-Hart Model 260 standard contact angle goniometer. Six readings were collected for both the dry (unconditioned) and each of the wet (conditioned) samples. A contact angle susceptibility index (CASI) was calculated using Equation 3, where $CA_{wet}$ is the contact angle of the wet sample and $CA_{dry}$ is the contact angle of the dry sample.

$$CASI = (CA_{wet} - CA_{dry})/CA_{dry} \tag{3}$$

Moisture-Induced Shear Thinning Index (MISTI).

The MISTI test measures the change at the interface of a thermoplastic matrix and inclusions (e.g., bitumen and siliceous inclusions) due to an external stimulus, regardless of the cause or mechanism of the change. To do so, it determines the extent of change in shear thinning before and after an external stimulus is applied. When the external stimulus is water conditioning, the indicator is referred to as "moisture-induced shear thinning" which is a measure of the extent of damage caused by water. It specifically targets chemistry driven moisture damage by tracking desorption of molecules adsorbed to siliceous inclusions prior to applying the external stimulus such as water conditioning. If pre-adsorbed molecules are easily desorbed by water molecules, they lead to a large change in moisture-induced shear thinning indicating that the sample is prone to moisture damage. Therefore, the test is designed to detect molecular species that are detrimental to resistance of the thermoplastic to moisture.

Applying an external stimulus can include subjecting a wet sample and a dry sample to a shear rate sweep test at a given temperature. The viscosity corresponding to each shear rate is calculated, and the MISTI is determined using Equation 4, wherein Viscosity=(shear strain)/(shear rate).

$$MISTI = \frac{\text{Average Slope (Viscosity vs Shear rate) of Wet Specimen}}{\text{Average Slope (Viscosity vs Shear rate) of Dry Specimen}} \quad (4)$$

To determine the moisture susceptibility of the intermolecular interaction between asphalt binder and aggregates, a moisture-induced shear thinning index was implemented with an Anton-Parr MCR 302. Samples were made by blending the asphalt binder with 50% glass beads by weight of binder; the glass beads had a selected diameter of 100 microns. The samples were mixed for 5 at 145° C., then 10 samples weighing 0.3 grams each were poured into 8 mm molds and annealed for 30 minutes. Five were tested immediately at the dry state, while the other five were demolded and placed into distilled water at 60° C. for 24 hours. Conditioned samples were removed from the water bath and lightly dried before testing. A ramping shear rate of 0.1 to 420 l/s was selected for the test, with the testing temperature being adjusted in order to obtain an initial viscosity of approximately 1000 Pa·s. Once the viscosity versus shear rate graph was obtained, a power law equation was fitted to the steepest portion of the shear thinning curve to calculate the slope. The moisture-induced shear thinning index was then determined using Equation 5, where CS and US refer to conditioned sample and unconditioned sample, respectively MISTI=power law fitted slope of CS/power law fitted slope of US (5)

Results and Discussion

Tensile Strength Ratio.

Results of the tensile strength showed that the strength of unconditioned specimen is higher than the conditioned ones. Also, for both unconditioned and conditioned samples, the strength of 15% RAP was higher than the control. Based on the peak tensile strength results, Tensile Strength Ratio (TSR) was estimated. Table 2 shows a summary of the results.

As can be seen in Table 2, the strength of the conditioned samples with salty water after 24 hours slightly increased compared to those conditioned in tap water. However, the difference was not statistically significant. Since the saturation of the samples was between 70% and 80%, and the concentration of salt in the water was 24%, this effect can be attributed to the presence of salts in solution. The small increase in the tensile strength could be related to the aggregates composition-pore water chemical interactions.

On the other hand, samples conditioned in acidic water showed 10.7% and 11.2% decrease in tensile strength for Control and 15% RAP, respectively. In addition, it was noticed that after 24 h conditioning at 60° C., some fine aggregates were separated from the samples and precipitated to the bottom of the glass jars of acidic water conditioning bath. The effect of acid water on the pavements is classified as a chemical erosion which starts with the loss of properties in the asphalt matrix.

Regarding the TSR results, both control and 15% RAP samples had values over 80% when the conditioning was in tap water. Salty water conditioned samples showed around 6% more TSR than tap water conditioned specimens. The effect of salt on pavements is due at least in part to the cation exchange between the clay part of the pavement material and the salty water, or interface between feldspars in the aggregates and salt. The negative effect of salty water such as tidal water, can be explained at least in part by the presence of additional chemicals like chloride and sulfate with different concentrations.

The lowest TSR values correspond to the conditioned samples under acidic water. Acidic water conditioned specimens had a decrease in the TSR of around 11% compared to the ones conditioned in tap water. Therefore, moisture damage on pavements is considerably increased by exposure to acidic water. The acidic water effect causes the loss of mass in the asphalt mixture and leaves the aggregates exposed. This in turn leads to a loss of bonding between aggregates and binder accelerating the moisture damage.

Binder Bond Strength (BBS) Test.

Table 3 presents a summary of the BBS test results after different conditioning scenarios for both control binder and binder extracted from the 15% RAP mixture.

TABLE 2

Peak Tensile Stresses and TSR for Control and 15% RAP samples

| Type of Sample | Aspect | Unconditioned | Tap Water Conditioned | Salty Water Conditioned | Acidic Water Conditioned |
|---|---|---|---|---|---|
| Control | Average Indirect Tensile Strength (kPa) | 1312.6 | 1077.3 | 1161.2 | 936.7 |
| | COV (3 samples) | 2.6% | 2.1% | 7.2% | 8.6% |
| | TSR | | 82.1% | 88.5% | 71.4% |
| 15% RAP | Average Indirect Tensile Strength (kPa) | 1540.4 | 1235.8 | 1352.3 | 1062.4 |
| | COV (3 samples) | 3.4% | 6.0% | 3.6% | 8.1% |
| | TSR | | 80.2% | 87.8% | 69.0% |

TABLE 3

Pull off tensile strength summary before and after water conditioning

| Type of Sample | Aspect | Unconditioned | Distilled Water Conditioned | Salty Water Conditioned | Acidic Water Conditioned |
|---|---|---|---|---|---|
| Control | Average Pull-off tensile Strength (kPa) | 2346.0 | 2914.6 | 3085.9* | 2459.4 |
| | COV (3 samples) | 7.6% | 4.3% | 1.9% | 4.1% |
| | Pull-off Strength Moisture Susceptibility Index | | 24.2% | 31.5% | 4.8% |
| 15% RAP | Average Pull-off tensile Strength (kPa) | 2909.9 | 3236.9* | 3277.6 | 3128.4 |
| | COV (3 samples) | 6.7% | 2.0% | 2.6% | 5.6% |
| | Pull-off Strength Moisture Susceptibility Index | | 11.2% | 12.6% | 7.5% |

*Actual value beyond measurable tensile force limit of the machine

Pull-off tensile strength results for both Control and 15% showed an increase of peak tensile force required to pull off the binder adhered to glass after water conditioning. However, the 15% RAP samples showed consistently higher pull-off tensile strength values compared to the control binder. The type of failure was mostly adhesive and did not alter significantly from dry to acid and distilled conditioned samples. However, the samples conditioned in salty water failed via cohesive failure for both samples. This non-intuitive behavior is thought to be because the effect of the water is limited only to the boundary edge of the binder and the glass and not through the pores of the aggregate surface.

This then permits focus on the impact of water on the asphalt binder's ability to adhere to the surface. Through the use of linear variable displacement transformers (LVDTs), it was found that the higher values are due at least in part to the binder stiffening from the water conditioning.

The sample conditioned in acidic water had a lower pull off tensile strength than the distilled and salty water. The differences in tensile strengths and in index values for both samples denote the impact of differing water compositions on pull-off tensile strength of the asphalt binder from the glass surface.

Shear Rate Test (SRT).

The shear rate test results for the control and 15% RAP binder blended with 50% glass beads conditioned in distilled, acid, and salty water are given in Table 4. Due to the differing viscosities, the samples were tested at 64 and 70° C., respectively. Despite similar viscosities and shear thinning onsets, the power law slope shows a consistently steeper slope for the control binder indicating higher intermolecular interaction between glass and unaged (control binder) than that of glass to aged binder (extracted from the 15% RAP Mixture). Exposure to acidic water significantly altered the interaction of glass and binder for both unaged and aged binder as evidenced by the shear rate moisture susceptibility index values. It is also interesting to note that the increase in zero shear viscosity was lowest for acid water conditioned samples. The increased susceptibility to the acid water could be due to the increased interaction of ions to the more polar asphaltenes components of asphalt.

TABLE 4

Shear Rate Test Results for Binder/Glass Bead Blend for Various Conditioning Water

| | Dry | | Distilled Water | | Acid Water | | Salty Water | |
|---|---|---|---|---|---|---|---|---|
| | Unaged | Aged | Unaged | Aged | Unaged | Aged | Unaged | Aged |
| Power Law Slope | −2.72 | −2.57 | −3.15 | −2.54 | −3.59 | −2.12 | −2.81 | −2.22 |
| Zero Shear Viscosity | 1015 | 931 | 1150 | 1080 | 1163 | 999 | 1280 | 1085 |
| Onset of Shear Thinning (1/s) | 1.57 | 1.87 | 1.18 | 1.00 | 1.28 | 1.14 | 1.21 | 1.31 |
| Shear Rate Moisture Susceptibility Index | | | 16% | 1% | 32% | 17% | 3% | 13% |

Contact Angle (CA).

The contact angle of the asphalt binder on the glass slide before and after water conditioning was measured and are given in the Table 5. The 15% RAP sample showed a high susceptibility to change in contact angle in both the distilled and the acid water. However, the salty water showed very little change, suggesting that the asphalt binder sample did not bead up. The control binder was also tested but the beading was not uniform and could not be accurately measured. Therefore, the mass of the samples before and after moisture conditioning were recorded and compared to determine if samples absorbed water. From the results in Table 5, the control sample mass did not change with the salty water and the change in distilled water was only 0.0001 mg. However, the mass change in acidic water was 0.0036 mg.

TABLE 5

Contact Angle and Mass Change Results
for Control and 15% RAP Specimens

|  | Distilled | Acidic | Salty |
|---|---|---|---|
| Change in Contact Angle | | | |
| Control (Unaged) | N/A | N/A | N/A |
| 15% RAP (Aged) | 94.72° | 89.12° | 3.56° |
| Change in Mass | | | |
| Control (Unaged) | 0.0001 mg | 0.0036 mg | 0 mg |
| 15% RAP (Aged) | N/A | N/A | N/A |

It was found that conditioning asphalt mixture samples with acidic water significantly lower the tensile strength ratio compared to conditioning in tap and salty water. Acidic water conditioning showed significantly different results compared to distilled water on the mastic and binder level as well. BBS results showed an increase for all samples in the peak tensile force required to pull the samples of binder off the glass slides after water conditioning. However, the acid conditioned peak tensile force samples were as much as 28% lower than distilled and salty water conditioning. Also, acidic water showed increased moisture susceptibly compared to distilled water, as evidenced in 16% higher change in slope of thinning and the increase in viscosity being lower. In addition, the change in mass of the asphalt binder was over 30 times higher in acid water compared to distilled water.

DeltaST.

Impact-resistant abrasive glass beads with a diameter of 100 microns were used. A sample of bituminous composite was prepared by blending a 1:2 ratio of glass beads and bitumen. Ten specimens (8 mm diameter×2 mm thick) were prepared and allowed to sit for one hour at room temperature. The samples were then divided into two groups. Five were tested in dry conditions, and five were tested after being water-conditioned in distilled water for 24 hr at 60° C. To perform the test, a shear rate sweep test (0.1-100 l/s) was applied using a dynamic shear rheometer 8-mm parallel plate assembly).

To determine the DeltaST, the slope of the shear-thinning region was determined for unconditioned samples and conditioned samples using a power-law equation, as shown in FIG. 1. The DeltaST was then calculated as the absolute value of the difference between the shear-thinning value in dry conditions and the shear-thinning value in wet conditions.

To determine whether the shear-thinning value is sensitive to changes at the interface of bitumen and stone aggregates, the surface chemistry of inclusions was intentionally changed prior to mixing by functionalizing them with various bio-oils. The interaction of the inclusions with bitumen is highly impacted by the surface properties of the inclusion, which determine the interfacial bond. The displacement of bitumen molecules at the surface of stones by water changes the bitumen-stone interfacial bond, and the shear-thinning value is shown to be able to detect changes in the interfacial bond. The following sections describe the use of the DeltaST test to compare the shear-thinning values of various bituminous composites in dry conditions and in wet conditions as a measure of susceptibility to moisture damage.

In another example, the shear-thinning slopes of bitumen containing commercial fibers were measured before and after water conditioning. The fibers were made from a blend of aramid and polyolefin fibers with a length of approximately 2.5 mm; they were blended at a 0.5% concentration by weight of the binder. The shear-thinning values changed after water conditioning, indicating sensitivity of the test to even slight changes at the interfacial bond. DeltaST, the absolute value of the difference between shear thinning at dry conditions and at wet conditions, is indicative of moisture susceptibility. The fibers were then treated with a bio-oil to determine if the fiber/binder interaction would change. The results showed a slight reduction in shear thinning, and the change in DeltaST was observed to increase from 0.297 to 0.175. A DeltaST value of zero indicates no change at the interface due to water. Any DeltaST above zero is indicative of moisture causing changes at the interface.

In yet another example, three different binders were evaluated before and after water conditioning. Binder A was not sensitive to moisture, while binders B and C were quite susceptible to moisture. The absolute value of the difference between shear thinning in dry conditions and in wet conditions for binder A is nearly zero, indicating no changes due to water exposure. The changes in binders B and C may indicate notable water diffusion into the binder, causing phase separation. The binder samples were then blended with glass beads and tested before and after water conditioning. The results showed different shear thinning for various binder samples in dry conditions, indicating a different affinity for interacting with glass beads in each scenario. However, their interactions with glass beads were not impacted by the presence of water. In addition, the extent of change from dry conditions to wet conditions was found to be very different, showing each binder has a different susceptibility to water. For instance, binder A showed no sensitivity to moisture, while B and C were both susceptible to water: B increased shear thinning, and C decreased shear thinning. This is another indication that DeltaST can detect changes at the interface of bitumen and glass beads. The results of binder A were then compared with its aged counterparts from field-extracted asphalt mixture samples. The results showed an overall reduction in shear-thinning value after aging, which indicates aged binders have weaker interactions with glass beads. However, regardless of aging level, binder A did not show evidence of moisture susceptibility. This indicates that aging alone does not necessarily induce moisture susceptibility.

Studying binders extracted from an asphalt mixture containing 25% RAP and doped with three different rejuvenators showed the effects of various rejuvenators on moisture susceptibility. The use of rejuvenators alters the moisture susceptibility of the base binder to the point that binder with rejuvenator Hy was no longer moisture-susceptible, while binders containing Rej-1 and Rej-2 both showed signs of moisture susceptibility. This confirms that water molecules generally do not displace the molecules of rejuvenator Rej-Hy adsorbed to siliceous surfaces.

The effect of the pH of the conditioning water on amplifying the moisture damage was also studied. This was done to examine the effect of acidic rain and/or deicing salt on increasing the extent of moisture damage. The shear-thinning value was capable of distinguishing the effect of the pH of water and the inclusion of salt, showing that bituminous composites having recycled asphalt are more impacted by the pH of the water and salt inclusion.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of assessing an interaction between solid particles and a thermoplastic material in which the solid particles are dispersed, the method comprising:
   combining a thermoplastic material with a multiplicity of solid particles to yield a heterogeneous mixture;
   processing the heterogeneous mixture to yield an unconditioned sample, wherein processing the heterogeneous mixture comprises one or both of:
      heating the heterogeneous mixture, and
      molding the heterogeneous mixture into a selected shape and size;
   conditioning the unconditioned sample to yield a conditioned sample, wherein conditioning the unconditioned sample comprises one or more of:
      aging the unconditioned sample,
      subjecting the unconditioned sample to a freeze-thaw cycle, and
      exposing the unconditioned sample to a liquid;
   subjecting the conditioned sample to a ramping shear rate from an initial shear rate to a final shear rate;
   assessing a viscosity of the conditioned sample at a plurality of shear rates between the initial shear rate and the final shear rate;
   assessing a value of a slope of a shear-thinning region for the unconditioned sample using a power-law equation; and
   assessing an effect on a bond strength between the solid particles and the thermoplastic material based on the value of the slope.

2. The method of claim 1, further comprising:
   subjecting the unconditioned sample to a ramping shear rate from the initial shear rate to the final shear rate;
   assessing a viscosity of the unconditioned sample at a plurality of shear rates between the initial shear rate and the final shear rate; and
   assessing a value of a slope of a shear-thinning region for the conditioned sample using a power-law equation.

3. The method of claim 2, further comprising assessing a difference between the value of the slope of the shear-thinning region for the unconditioned sample and the value of the slope of the shear-thinning region for the conditioned sample.

4. The method of claim 3, further comprising identifying, for a non-zero difference, a susceptibility of thermoplastic material to the conditioning, wherein the susceptibility corresponds to a change in bond strength between the solid particles and the thermoplastic material.

5. The method of claim 1, wherein processing the heterogeneous mixture comprises heating the heterogeneous mixture.

6. The method of claim 1, wherein conditioning the unconditioned sample comprises aging the unconditioned sample.

7. The method of claim 1, wherein conditioning the unconditioned sample comprises subjecting the unconditioned sample to a freeze-thaw cycle.

8. The method of claim 1, wherein conditioning the unconditioned sample comprises exposing the unconditioned sample to a liquid.

9. The method of claim 8, wherein conditioning the unconditioned sample comprises exposing the unconditioned sample to the liquid for a length of time between 2 hours and 48 hours.

10. The method of claim 8, wherein the liquid comprises an aqueous solution, a solvent, or an oil.

11. The method of claim 10, wherein the liquid comprises the aqueous solution, and the aqueous solution is acidic.

12. The method of claim 11, wherein a pH of the aqueous solution is less than 5.

13. The method of claim 10, wherein the liquid comprises the aqueous solution, and the aqueous solution comprises one or more of salt, carbon dioxide, sulfur dioxide, and nitrogen oxide.

14. The method of claim 1, further comprising adjusting the viscosity of the conditioned sample to an initial viscosity before assessing the viscosity of the conditioned sample at the plurality of shear rates.

15. The method of claim 14, wherein adjusting the viscosity of the conditioned sample comprises heating the conditioned sample.

16. The method of claim 14, wherein the initial viscosity is about 1000 Pa·s.

17. The method of claim 1, wherein the thermoplastic matrix comprises bitumen.

18. The method of claim 1, wherein the solid particles comprise glass beads.

19. The method of claim 1, wherein combining the thermoplastic material with the multiplicity of solid particles comprises forming a composite comprising the multiplicity of solid particles dispersed in a matrix of the thermoplastic material.

20. The method of claim 1, wherein processing the heterogeneous mixture to yield an unconditioned sample comprises molding the heterogeneous mixture into a selected shape and size.

* * * * *